US007714077B2

(12) United States Patent
Tanaka et al.

(10) Patent No.: US 7,714,077 B2
(45) Date of Patent: May 11, 2010

(54) TRIBLOCK COPOLYMER, METHOD FOR PRODUCING THE SAME, AND BIOCOMPATIBLE MATERIAL

(75) Inventors: Shinji Tanaka, Tsukuba (JP); Kenji Kato, Taketa (JP); Yuichi Ohya, Settsu (JP); Tatsuo Ouchi, Minoh (JP)

(73) Assignee: NOF Corporation, Tokyo (JP)

( * ) Notice: Subject to any disclaimer, the term of this patent is extended or adjusted under 35 U.S.C. 154(b) by 1003 days.

(21) Appl. No.: 10/563,560

(22) PCT Filed: Jul. 7, 2004

(86) PCT No.: PCT/JP2004/009628
§ 371 (c)(1),
(2), (4) Date: May 12, 2006

(87) PCT Pub. No.: WO2005/003214
PCT Pub. Date: Jan. 13, 2005

(65) Prior Publication Data
US 2006/0223975 A1 Oct. 5, 2006

(30) Foreign Application Priority Data

Jul. 7, 2003 (JP) ............................... 2003-192701
Jul. 8, 2003 (JP) ............................... 2003-193281

(51) Int. Cl.
*C08F 283/06* (2006.01)
*C08G 69/10* (2006.01)
*C08G 69/48* (2006.01)
*C08G 63/08* (2006.01)
*C08G 63/664* (2006.01)
*C08G 81/00* (2006.01)

(52) U.S. Cl. ................... 525/419; 525/420; 525/450; 525/88; 525/415; 528/328; 528/354; 424/425; 424/426; 424/486

(58) Field of Classification Search ................ 525/415, 525/88, 419, 420, 450; 528/354, 328; 424/425, 424/426, 486, 507
See application file for complete search history.

(56) References Cited
U.S. PATENT DOCUMENTS
5,399,665 A 3/1995 Barrera et al.

6,201,072 B1 3/2001 Rathi et al.
6,245,740 B1 6/2001 Goldenberg et al.

FOREIGN PATENT DOCUMENTS
JP 08-176016 7/1996

(Continued)

OTHER PUBLICATIONS

Tatsuro Ouchi et al, "Preparation of Poly[DL-lactide-co-glycolide]-based microspheres containing protein by use of amphiphilic diblock copolymers of dipsipeptide and lactide having ionic pendant groups as biodegradable surfactants by W/O/W emulsion method", Polymer, vol. 45, No. 5, Mar. 1, 2004, pp. 1583-1589.

(Continued)

*Primary Examiner*—Duc Truong
(74) *Attorney, Agent, or Firm*—Sughrue Mion, PLLC

(57) ABSTRACT

The present invention relates to a triblock copolymer, that is multipurpose yet has sufficient properties particularly for medical applications, and is useful as a material having excellent flexibility and water absorbability, as well as to a method for producing the same, and a biocompatible material. The copolymer of the present invention is composed of segments $A^1$ and $A^2$ each composed of a polymer having a depsipeptide unit, such as a segment selected from a homopolymer of depsipeptide or a copolymer of lactide and depsipeptide, and segment B composed of polyalkylene glycol, such as PEG, and is a $A^1$-B-$A^2$ triblock copolymer having a number average molecular weight of 8000 to 500000. The biocompatible material of the present invention contains the triblock copolymer as a main component, and may be used as a tissue antiadhesion barrier.

10 Claims, 3 Drawing Sheets

FOREIGN PATENT DOCUMENTS

| | | |
|---|---|---|
| JP | 08-199052 | 8/1996 |
| JP | 11 302374 | 11/1999 |
| JP | 2001-31762 | 2/2001 |
| JP | 2002-234934 | 8/2002 |
| WO | WO 96/19519 A | 6/1996 |
| WO | WO 99/18142 | 4/1999 |
| WO | WO 00/00222 | 1/2000 |
| WO | 01/82970 | 11/2001 |

OTHER PUBLICATIONS

George John, et al.; Synthesis and Modification of New Biodegradable Copolymers: Serine./Glycolic acid Based Copolymers; New Biodegradable Copolymers; pp. 1901-1907,1997.

Tatsuro Ouchi, et al.; Synthesis and Enzymatic Hydrolysis of Lactic Acid-Depsipeptide Copolymers with Functionalized Pendant Groups; Journal of Polymer Science: Part A: Polymer Chemistry, Vo. 35, 377-383 (1997).

S. M. Li, et al.; Synthesis, Characterization, and Hydrolytic Degradation of PLA/PEO/PLA Triblock Copolymers with Long Poly(L-lactic acid) Blocks; Macromolecules, vol. 29, No. 1, 1996; pp. 57-62.

Hans R. Kricheldorf, et al; Polymerization of $L_{,L}$-lactide and rac-D-L-lactide with hematin and related porphyrin complexes; Makromol. Chem. 194,463-473 (1993).

K.J. Zhu, et al.; Preparation, Characterization, and Properties of Polylactide (PLA)-Poly(ethylene Glycol) (PEG) Copolymers: A Potential Drug Carrier; Journal of Applied Polymer Science, vol. 39, 1-9 (1990).

Yoshiharu Kimura, et al.; Preparation of block copoly(ester-ether)comprising poly(L-lactide)and poly(oxypropylene) and degradation of its fibre in vitro and in vivo; Polymer, 1989, vol. 30, Jul. 1342-1349.

X.M. Deng; et al; Synthesis and Characterization of Block Copolymers from D,L-Lactide and Poly(Ethylene Glycol) with Stannous Chloride; Journal of Polymer Science: Part C; Polymer Letters, vol. 28,411-416(1990).

TRIBLOCK COPOLYMER, METHOD FOR PRODUCING THE SAME, AND BIOCOMPATIBLE MATERIAL

FIELD OF ART

The present invention relates to $A^1$-B-$A^2$ triblock copolymers composed of a hydrophilic segment (B) consisting of a polyalkylene glycol, such as polyethylene glycol, and hydrophobic segments ($A^1$ and $A^2$) each consisting of a polymer having a depsipeptide unit, such as a homopolymer of depsipeptide or a copolymer of lactide and depsipeptide. The present invention also relates to a method for producing the triblock copolymers, and biocompatible materials including tissue anti-adhesion barrier.

BACKGROUND ART

Aliphatic polyesters have recently been attracting much attention from the environmental point of view for their gradual degradability by climate or biological environment into non-toxic degradation products when left in natural environment. Aliphatic polyesters have also been a subject of many researches in medical field, as bioabsorbable materials. As a typical aliphatic polyester, polylactide is known.

Polylactide has a melting point of as high as 173° C. and excellent mechanical strength, but, on the other hand, its high crystallinity results in rigid property (314 Kpsi) and lack of flexibility and water absorbability. Such properties of polylactide limit its application mainly to medical joint and screws for bones or the like, or plates. In order to overcome such disadvantages, block copolymers of aliphatic polyester and flexible polyalkylene glycol are proposed in Non-patent Publications 1 to 5 and other publications. However, there has been no discussion made to date about random copolymerization of polylactide and polydepsipeptide.

Even block copolymers of polyethylene glycol (PEG) and polylactide that are available from the researches to date, have not given biocompatible materials that could stand for clinical use. For achieving sufficient flexibility and water absorbability, the polymerization degree of polylactide must be reduced, which inevitably lowers the mechanical strength and results in severely limited applications. On the other hand, if the polymerization degree of polylactide is increased, the bioabsorbability of the resulting copolymer is lowered, and flexibility and water absorbability can no longer be expected. Thus the copolymer cannot sufficiently exhibit functions as a biocompatible material.

Patent Publication 1 discloses to add PEG having a molecular weight of not lower than 2000 as a third component to a copolymer of polylactide and polyalkylene ether, such as PEG, which is a hydrophilic polymer. This publication, however, discloses merely a blend with a plasticizer, and does not disclose copolymerization with amino acid. The technical point of this example is to blend PEG as a plasticizer, which achieves improvement in rigidity compared to polylactic acid alone, but is not expected to achieve elasticity like living tissues. In addition, the plasticizer (PEG), which leaks in water, has limited in vivo applications.

Patent Publication 2 discloses an A-B-A triblock copolymer of PEG and aliphatic polyester polycaprolactone as an injectable polymer for drug delivery that is degradable in living organisms. This solution, however, disperses in water, and naturally mechanical strength cannot be expected. This publication is silent about a copolymer of PEG and polylactide, polyglutamic acid, or polyaspartic acid as a hydrophobic segment.

Patent Publication 3 discloses a polylactic acid block copolymer having an amide bond. However, this copolymer is not expected, from its molecular structure, to have absorbability and flexibility sufficient for a biocompatible material.

Non-patent Publications 6 and 7 report on copolymerization of depsipeptide and lactide. However, this copolymerization aims at introduction of functional groups into lactide, and sufficient water absorbability and flexibility cannot be expected in the copolymer per se. A triblock copolymer of PEG and a random copolymer of lactide and depsipeptide, or an A-B-A block copolymer of PEG and depsipeptide is not known.

Patent Publications 4 to 6 disclose reverse thermal sensitivity and various applications, such as preparation for sustained drug delivery, of a block copolymer of PEG and polylactide. However, the PEG constituting this copolymer has a molecular weight of 500 to 10000, so that both the mechanical strength and the moisture retaining ability of the gel can hardly be met at the same time. On the other hand, when the compositional ratio of polylactide is increased to achieve sufficient gel strength, other problems will arise, such as reduced biodegradability, due to the crystallinity of polylactide, and thus the material can no longer be used as a biocompatible material.

Patent Publication 1: JP-8-199052-A

Patent Publication 2: JP-8-176016-A

Patent Publication 3: JP-11-302374-A

Patent Publication 4: JP-2002-533377-T

Patent Publication 5: JP-2002-519333-T

Patent Publication 6: JP-2002-516910-T

Non-patent Publication 1: Y. Kimura, et al., Polymer 30, p1342 (1989)

Non-patent Publication 2: X. M. Deng, et al., J. Polym. Sci. Polym. Lett., 28, p 411 (1990)

Non-patent Publication 3: K. J. Zhu, et al., J. Appl. Polym. Sci., 39, p 1 (1990)

Non-patent Publication 4: H. R. Kricheldorf, et al., Makromol. Chem., 194, p 463 (1993)

Non-patent Publication 5: S. M. Li, et al., Macromolecules, 29, p 57 (1996)

Non-patent Publication 6: T. Ouchi, et al., J. Polym. part A: Poly. Chem., 35, p 377-383 (1997)

Non-patent Publication 7: G. John, et al., J. Polym. Sci. Part A: Polym. Chem., 35, p 1901-1907 (1997)

SUMMARY OF THE INVENTION

It is an object of the present invention to provide a novel $A^1$-B-$A^2$ triblock copolymer and a method for producing the same, which is multipurpose yet has sufficient properties particularly for medical applications, is useful as a material having excellent flexibility and water absorbability, and may be made bioabsorbable as desired.

It is another object of the present invention to provide a biocompatible material useful, for example, as a tissue anti-adhesion barrier, which is used for multipurpose in the medical or other fields, flexible, excellent in tissue anti-adhesion property, and may be made bioabsorbable as desired.

According to the present invention, there is provided an $A^1$-B-$A^2$ triblock copolymer consisting of segments $A^1$ and $A^2$ each composed of a polymer having a depsipeptide unit, such as a segment selected from the group consisting of a homopolymer of depsipeptide and a copolymer of lactide and depsipeptide, and segment B composed of polyalkylene glycol, such as PEG, said triblock copolymer having a number average molecular weight of 8000 to 500000.

According to the present invention, there is also provided a $A^1$-B-$A^2$ triblock copolymer represented by the formula (1):

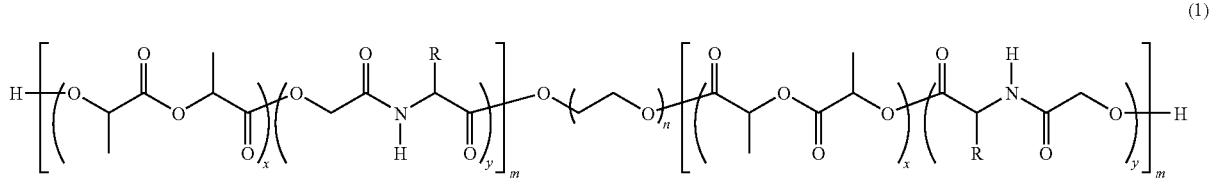

(1)

wherein R stands for a hydrogen atom, $CH_3$—, $CH_3CH_2$—, $(CH_3)_2CH$—, $(CH_3)_2CHCH_2$—, $CH_3CH_2CH(CH_3)$—, $C_6H_5CH_2$—, $C_6H_5CH_2O(C=O)CH_2$—, $C_6H_5CH_2O(C=O)CH_2CH_2$—, $C_6H_5CH_2O(C=O)NH(CH_2)_4$—, $C_6H_5(C=O)OCH_2$—, $C_6H_5(C=O)OC(CH_3)H$—, $CH_3O$—$C_6H_4$—$CH$—$SCH_2$— or $CH_3(CH_2)_{t-1}$—$S$—$SCH_2$—, provided that t is a positive integer; x and y each represents the number of repeating units in segments $A^1$ and $A^2$, x is an integer of 0 or more, y is an integer of 1 or more, and x and y satisfy the formula $0.04 \leq (y/(x+y)) \leq 1$; m and n each represents a polymerization degree, m is a positive integer, and n is an integer of 100 to 1200.

According to the present invention, there is provided a method for producing the above-mentioned triblock copolymer, comprising ring-opening polymerizing depsipeptide and lactide with a hydroxyl group at each end of polyethylene glycol having a polymerization degree of 100 to 1200, in the presence of a metal catalyst for ring-opening polymerization without a solvent.

According to the present invention, there is also provided a biocompatible material, such as a tissue anti-adhesion barrier, comprising the above-mentioned $A^1$-B-$A^2$ triblock copolymer as a main component.

According to the present invention, there is further provided use of the above-mentioned $A^1$-B-$A^2$ triblock copolymer for the manufacture of a biocompatible material, such as a tissue anti-adhesion barrier.

The triblock copolymer according to the present invention is an $A^1$-B-$A^2$ type copolymer having segments $A^1$ and $A^2$ each composed of a polymer having a depsipeptide unit, such as a segment selected from the group consisting of a homopolymer of depsipeptide and a copolymer of lactide and depsipeptide, and segment B composed of polyalkylene glycol, such as PEG, and having a particular number average molecular weight. Thus, the present copolymer may be used for materials that are flexible and water absorbable and are multipurpose yet have sufficient properties particularly for medical applications. The present copolymers may also be given bioabsorbability easily by controlling the kinds of the segments and the molecular weight.

The biocompatible material prepared from the triblock copolymer according to the present invention has excellent flexibility and tissue anti-adhesion property, and may also be made to exhibit bioabsorbability as desired. Thus, the present biocompatible material is particularly useful as a tissue anti-adhesion barrier, and also suitable for a variety of applications in the medical field.

PREFERRED EMBODIMENTS OF THE INVENTION

Figure 1:
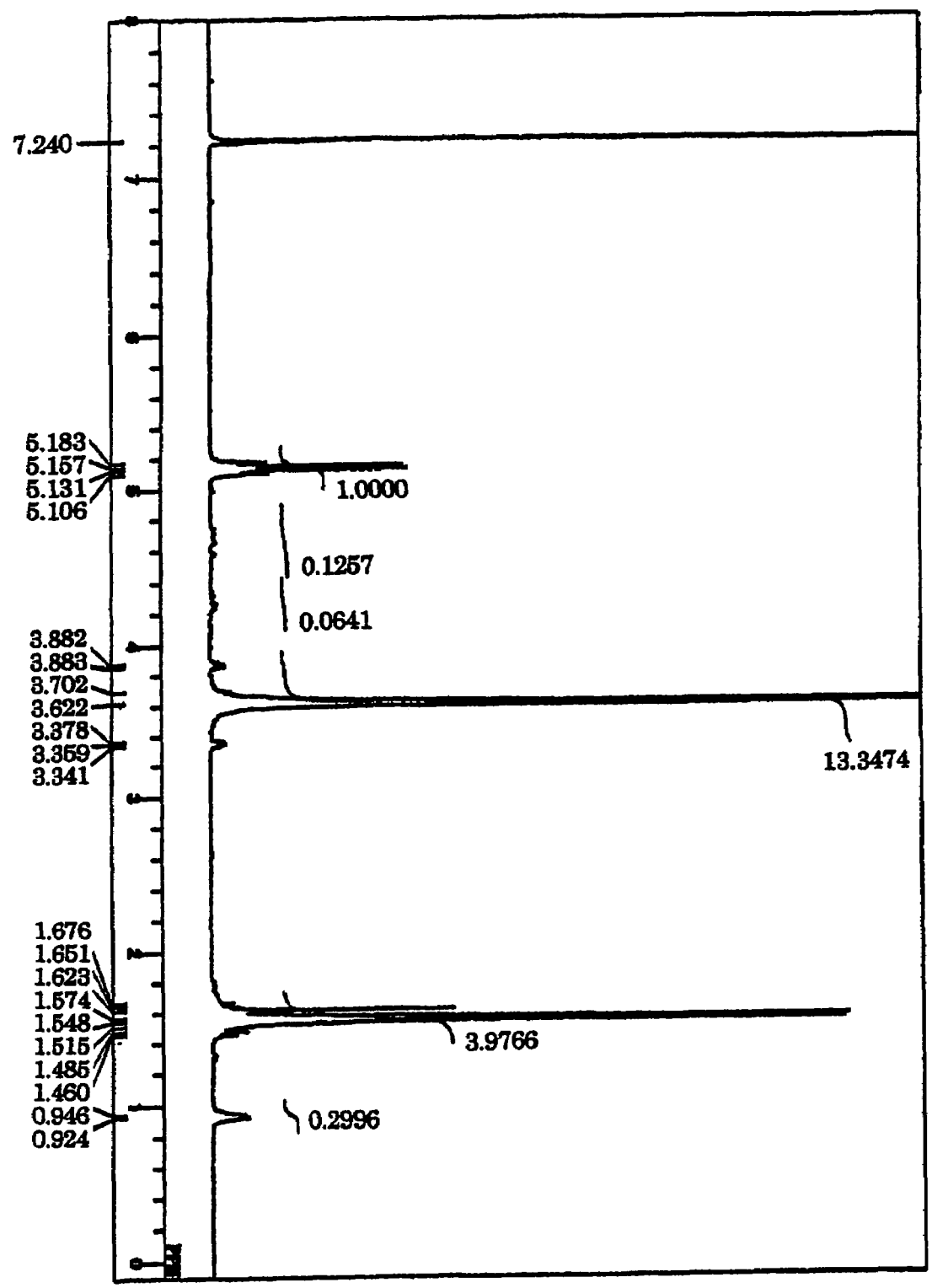
FIG. 1 shows a $^1$H-NMR spectrum of the triblock copolymer synthesized in Example 1-1.

The present invention will now be explained in detail.

The block copolymer of the present invention is an $A^1$-B-$A^2$ triblock copolymer wherein segment B is composed of polyalkylene glycol, and each of segments $A^1$ and $A^2$ is composed of a polymer having a depsipeptide unit, such as a segment composed of a homopolymer of depsipeptide or a random copolymer of lactide and depsipeptide. Here, the segments $A^1$ and $A^2$ may either be the same or different in composition, molecular weight, and the like.

The polyalkylene glycol constituting segment B may be a commercial product, such as a polyalkylene ether of a diol type having a hydroxyl group at each end. More specifically, one or more kinds of polyalkylene glycol selected from the group consisting of polyethylene glycol (PEG), polypropylene glycol, and polybutylene glycol, may be used. PEG having a number average molecular weight of 5000 to 50000, preferably 8000 to 40000, more preferably 10000 to 40000, may preferably be used for its high hydrophilicity.

Depsipeptide as a polymer constituent in the homopolymer of depsipeptide or the copolymer of lactide and depsipeptide that may constitute segments $A^1$ and $A^2_1$ is a compound wherein amino acid and α-hydroxy acid form an intramolecular cyclic self-ester. Depsipeptide may be synthesized, for example, by a method of Ouchi et al. (Synthesis and Enzymatic Hydrolysis of Polydepsipeptides with Functionalized Pendant Groups, Macromol. Chem. Phys., 197, 1823-1833 (1996)).

Examples of depsipeptide may include cyclic esters of glycolic acid and amino acid (R—$CH(NH_2)COOH$), cyclo(glycolic acid-amino acid), wherein R may stand for a hydrogen atom, $CH_3$—, $CH_3CH_2$—, $(CH_3)_2CH$—, $(CH_3)_2CHCH_2$—, $CH_3CH_2CH(CH_3)$—, $C_6H_5CH_2$—, $C_6H_5CH_2O(C=O)CH_2$—, $C_6H_5CH_2O(C=O)CH_2CH_2$—, $C_6H_5CH_2O(C=O)NH(CH_2)_4$—, $C_6H_5(C=O)OCH_2$—, $C_6H_5(C=O)OC(CH_3)H$—, $CH_3O$—$C_6H_4$—$CH$—$SCH_2$—, or $CH_3(CH_2)_{t-1}$—$S$—$SCH_2$—, provided that t is a positive integer.

Examples of the cyclic ester, cyclo(glycolic acid-amino acid), may include cyclo(glycolic acid-L-alanine) (R=$CH_3$—), cyclo(glycolic acid-glycine) (R=H), cyclo(glycolic acid-L-leucine) (R=$(CH_3)_2CHCH_2$—), cyclo(glycolic acid-L-isoleucine) (R=$CH_3CH_2CH(CH_3)$—), cyclo(glycolic acid-L-valine) (R=$(CH_3)_2CH$—) cyclo(glycolic acid-L-phenylalanine) (R=$C_6H_5CH_2$—), cyclo(glycolic acid-benzyl L-aspartate) (R=$C_6H_5CH_2O(C=O)CH_2$—), cyclo(glycolic acid-benzyl L-glutamate) (R=$C_6H_5CH_2O(C=O)CH_2CH_2$—), cyclo(glycolic acid-benzyloxycarbonyl L-lysinate) (R=$C_6H_5CH_2O(C=O)NH(CH_2)_4$—), cyclo(glycolic acid-phenylcarbonyl L-threonate) (R=$C_6H_5(C=O)OC(CH_3)H$—), cyclo(glycolic acid-methoxybenzyl-S-cysteine) (R=$CH_3O$—$C_6H_4$—$CH$—$SCH_2$—), and cyclo (glycolic acid-alkyl disulfide-cysteine) (R=CH$_3$(CH$_2$)$_{t-1}$—S—SCH$_2$—), which are preferred for their availability for synthesis.

Lactide as a polymer constituent in the random copolymer of lactide and depsipeptide that may constitute segments A$^1$ and A$^2$, is an intramolecular cyclic diester compound obtained by dehydrating two molecules of α-hydroxy acid. Examples of lactide may include intramolecular cyclic diesters of lactic acid, such as D-lactide, L-lactide, and D,L-lactide, and intramolecular cyclic diesters of glycolic acid, such as glycolide. These lactides provide physical cross-linking points in self-assembly of the triblock copolymers. Since lactides have various crystallinity, the hydrolyzability and mechanical strength of the triblock copolymer may be controlled by using single glycolide or combining a plurality of lactides of different crystallinity. In this way, the in vivo structural stability and biostability of the triblock copolymer may be adapted to the intended application. L-lactide is preferred as lactide for its availability.

The triblock copolymer of the present invention may be synthesized by ring-opening polymerizing depsipeptide or depsipeptide and lactide as constitutional units of segments A$^1$ and A$^2$, to the hydroxyl group at each end of the polyalkylene glycol of segment B, in the presence of a metal catalyst for ring-opening polymerization without a solvent, as will be discussed later.

The molecular weight of the triblock copolymer of the present invention may easily be designed by adjusting the molecular weight of the starting material polyalkylene glycol, such as PEG, the amounts of lactide and depsipeptide to be used for the reaction, the kind of the catalyst, and the reaction time. The number average molecular weight of the present triblock copolymer is 8000 to 500000, preferably 12000 to 30000. At less than 8000, properties expected in medical use may not be exhibited, whereas at more than 500000, the copolymer is too viscous to be handled easily during its production.

The triblock copolymer of the present invention is preferably an A$^1$-B-A$^2$ triblock copolymer represented by the formula (1) above, for its ability to sufficiently exhibit various properties, such as flexibility and water absorbability.

In the formula (1), R stands for a hydrogen atom, CH$_3$—, CH$_3$CH$_2$—, (CH$_3$)$_2$CH—, (CH$_3$)$_2$CHCH$_2$—, CH$_3$CH$_2$CH(CH$_3$)—, C$_6$H$_5$CH$_2$—, C$_6$H$_5$CH$_2$O(C=O)CH$_2$—, C$_6$H$_5$CH$_2$O(C=O)CH$_2$CH$_2$—, C$_6$H$_5$CH$_2$O(C=O)NH(CH$_2$)$_4$—, C$_6$H$_5$(C=O)OCH$_2$—, C$_6$H$_5$(C=O)OC(CH$_3$)H—, CH$_3$O—C$_6$H$_4$—CH—SCH$_2$—, or CH$_3$(CH$_2$)$_{t-1}$S—SCH$_2$—, wherein t is a positive integer, preferably an integer of 1 to 20. x and y each represents the number of repeating units in segments A$^1$ and A$^2$. x is the number of repeating units for lactide, and denotes a number of not less than 0. y is the number of repeating units for depsipeptide and denotes a number of not less than 1. x and y satisfy the formula $0.04 \leq (y/(x+y)) \leq 1$. A preferred minimum value for $(y/(x+y))$ is usually 0.05, particularly 0.1, and a preferred maximum value is 0.2. When the copolymer is used as a biocompatible material as will be discussed later for a tissue anti-adhesion barrier having bioabsorbability, it is particularly preferred that x and y satisfy the formula $$0.04 \leq (y/(x+y)) \leq 0.2.$$

m represents the polymerization degree of segments A$^1$ and A$^2$, and is an integer of not less than 1. n represents the polymerization degree of segment B, and is an integer of 100 to 1200. The bonds in the brackets [ ] may either be random or block. When the copolymer is used as a biocompatible material as will be discussed later for a tissue anti-adhesion barrier having bioabsorbability, it is particularly preferred that n is 250 to 455.

m, n, x, and y in the formula (1) more preferably fall in such ranges that satisfy n=200 to 1100 and mx+my=5 to 80.

R in the formula stands for a group derived from an amino acid in the depsipeptide, and may be those exemplified for R in an amino acid in the depsipeptide.

Among the examples, for improved flexibility of the resulting polymer and reduced crystallinity of lactide in segments A$^1$ and A$^2$, R may preferably be an organic group selected from CH$_3$—, CH$_3$CH$_2$—, (CH$_3$)$_2$CH—, (CH$_3$)$_2$CHCH$_2$—, or CH$_3$CH$_2$CH(CH$_3$)—. In view of steric hindrance for further reduction of crystallinity, R may preferably be an organic group selected from (CH$_3$)$_2$CH— or (CH$_3$)$_2$CHCH$_2$—. For introducing reactive functional groups, R may preferably be an organic group selected from C$_6$H$_5$CH$_2$O(C=O)CH$_2$—, C$_6$H$_5$CH$_2$O(C=O)CH$_2$CH$_2$—, C$_6$H$_5$CH$_2$O(C=O)NH(CH$_2$)$_4$—, C$_6$H$_5$(C=O)OCH$_2$—, C$_6$H$_5$(C=O)OC(CH$_3$)H—, CH$_3$O—C$_6$H$_4$—CH—SCH$_2$—, or CH$_3$(CH$_2$)$_{t-1}$S—SCH$_2$—. Among these, CH$_3$O—C$_6$H$_4$—CH—SCH$_2$— and CH$_3$(CH$_2$)$_{t-1}$S—SCH$_2$— are particularly preferred for ready production of a crosslinked polymer by oxidation-reduction reaction, wherein free thiol groups are generated and adjacent free thiol groups on the copolymers are bonded to form a crosslinked polymer, or by using a maleimide crosslinker.

The triblock copolymer of the present invention may be synthesized, for example, by a method of the present invention, wherein depsipeptide alone, or depsipeptide and lactide, which may be constituting units of segments A$^1$ and A$^2$, are ring-opening polymerized with a hydroxyl group at each end of polyalkylene glycol, such as PEG, having a polymerization degree of 100 to 1200, which may constitute segment B, in the presence of a metal catalyst for ring-opening polymerization without a solvent. More specifically, a triblock copolymer of poly[lactide-r-(glycolic acid-amino acid)]-PEG-poly[lactide-r-(glycolic acid-amino acid)], wherein -r- represents random polymerization, may be prepared in accordance with the scheme illustrated by the Formula (2): Synthesis of poly[lactide-r-(glycolic acid-amino acid)]-PEG-poly[lactide-r-(glycolic acid-amino acid)] triblock copolymer

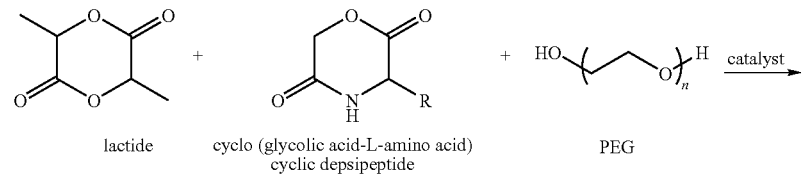

lactide    cyclo (glycolic acid-L-amino acid)    PEG
           cyclic depsipeptide -continued

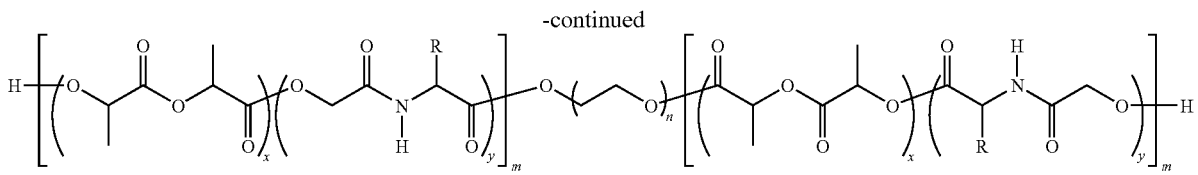

Here, the ratio of the depsipeptide units and the lactide units in the repeating units in segments $A^1$ and $A^2$, may be adjusted by changing the ratio of depsipeptide and lactide to be subjected to the ring-opening polymerization.

The metal catalyst for ring-opening polymerization used in the above method is not particularly limited, and may be those generally used as metal catalysts for ring-opening polymerization of cyclic esters. Examples of such a catalyst may include metals such as tin, zinc, lead, titanium, bismuth, zirconium, germanium, antimony, and aluminum; and derivatives thereof, such as tin 2-ethylhexanoate. Among these examples, tin compounds are preferred for their ability to easily control the molecular weight or the like of the resulting copolymer.

In the method of the present invention, the reaction temperature for the ring-opening polymerization is usually 90 to 180° C., preferably 100 to 160° C. The reaction time is usually 1 to 50 hours, preferably 4 to 36 hours.

In the method of the present invention, the polyalkylene glycol, such as PEG, depsipeptide, lactide, and metal catalyst for ring-opening polymerization may be reacted in a single system without a solvent, for example, by placing the materials together in a known reaction vessel in appropriate amounts, and adjusting to a predetermined reaction temperature.

Preferred amounts of polyalkylene glycol, depsipeptide, lactide, and the metal catalyst for ring-opening polymerization to be used for preparation of a triblock copolymer having a number average molecular weight of 8000 to 500000 are, for example, 2 mg to 20 g, preferably 2 mg to 5 g of depsipeptide; 0 to 25 g, preferably 0 to 5 g of lactide; and 0.5 to 5 mg of the metal catalyst for ring-opening polymerization, with respect to 1 g of PEG. In particular, for preparation of a triblock copolymer having a number average molecular weight of 12000 to 30000, the preferred amounts to be used are 40 mg to 10 g, preferably 0.02 g to 10 g of depsipeptide; 0 to 10 g, preferably 0.2 to 1 g of lactide; and 1 to 3 mg of the metal catalyst for ring-opening polymerization, with respect to 1 g of PEG. With such preferred amounts, both the strength and the bioabsorbability of the material to be obtained may excellently be achieved.

The triblock copolymer obtained by the method of the present invention may be purified before use, preferably by recrystallization, and may be processed into a preferred shape, such as a sheet, fiber, or film shape, depending on the application. For example, the copolymer may be processed into a water absorbable material or the like for use.

The biocompatible material according to the present invention contains the triblock copolymer of the present invention as a main component. For example, a triblock copolymer obtained by the above method may be made into a biocompatible material of the present invention by purifying by recrystallization or the like method, and subjecting to film, fiber, or powder formation by a conventional method.

The triblock copolymer used in the biocompatible material of the present invention has, in its molecule, segment B having low crystallinity, and segments $A^1$ and $A^2$ having hydrophobicity. Segments $A^1$ and $A^2$ form hydrophobic interaction between the molecules to provide physical properties including elastomeric flexibility and mechanical strength. Thus the biocompatible material of the present invention, when applied to a living organism, holds moisture quickly, and forms excellently biocompatible hydrogel.

Further, the triblock copolymer represented by the formula (1) used for the biocompatible material of the present invention is dissolved in body fluid and absorbed through hydrolysis or enzymatic digestion of segments $A^1$ and $A^2$ into a low molecular weight form in living organisms. Accordingly, the biocompatible material of the present invention does not have to be taken out by surgery or the like, and thus can remarkably reduce the burden on the patients.

The biocompatible material of the present invention may be used as a substrate for research into animal cells or organ cultures; a tissue anti-adhesion barrier used in gastroenterological surgery, orthopedics, plastic surgery, dentistry, obstetrics and gynecology; or a biocompatible material, such as inplants, sutures, artificial vessels, or artificial dura maters. The present biocompatible material is particularly suitable for a tissue anti-adhesion barrier.

When the biocompatible material of the present invention is used as a tissue anti-adhesion barrier, the triblock copolymer may be used, for example, alone or in a blend with natural or synthetic polymers, as a biocompatible material. In this way, a tissue anti-adhesion barrier may be obtained having handling property and a bioabsorption rate that meet the clinical requirements.

The above-mentioned blend may be prepared by dissolving and mixing the triblock copolymer and the natural or synthetic polymer in a common solvent miscible with both the triblock copolymer and the natural or synthetic polymer to be blended, and removing the solvent, or stirring and kneading under heating at a temperature not lower than the melting point of the triblock copolymer.

The natural polymer may be, for example, hyaluronan, heparin sulfate, chondroitin sulfate, carboxymethyl cellulose, gelatin, calcium alginate, chitosan, or derivatives thereof. The synthetic polymer may be, for example, polyethylene glycol, propylene glycol, or polycaprolactone.

The tissue anti-adhesion barrier of the present invention may be obtained by processing the biocompatible material into a thin film, sheet, film, or cloth form, or into a hydrogel membrane.

The triblock copolymer used for the tissue anti-adhesion barrier of the present invention may be any of the triblock copolymers of the present invention mentioned above, and preferably a triblock copolymer including polyalkylene glycol having a number average molecular weight of 8000 to 50000 in segment B, more particularly a triblock copolymer including PEG as polyalkylene glycol. Here, if the number average molecular weight of PEG is less than 8000, sufficient strength cannot be expected, whereas if remarkably over 50000, excretion from the living body may not be expected.

The tissue anti-adhesion barrier according to the present invention, when applied over a treatment site in the body during surgery, exhibits rapid water absorbability and good shape adaptability to soft tissues when gelled, gives little physical stimulation around the embedded site, and achieves good compatibility with living organisms. Thus the tissue anti-adhesion barrier of the present invention is expected to be an ideal tissue anti-adhesion barrier.

EXAMPLES

The present invention will now be explained in more detail with reference to Examples, which are illustrative only and do not intend to limit the present invention. The analytical methods, test procedures, and conditions adopted in Examples are shown below.

<$^1$H-NMR Measurement>

Model: JNM EX-270 (JEOL) manufactured by JEOL LTD.; Solvent: $CDCl_3$; Measurement temperature: 25° C.; Internal standard: $CHCl_3$ <Measurement of Molecular Weight by GPC>

Model: System SC-8020 manufactured by TOSOH CORPORATION; Column: TSKgel G3000 Hhr-G4000 Hhr; Eluent: DMF; Flow rate: 0.8 ml/min.; Detection: RI; Reference material: PEG <Bending Test Procedure>

For confirming the flexibility of the obtained film, the film in dry state was bent, and examined by touch whether the film may be bent without damage.

<Bioabsorbability Test Procedure>

For evaluation of the absorbability of the material in living organisms, a subcutaneous pocket was formed on the back of eight-week-old female ddy mice anesthetized in advance with Nembutal. A film of the material to be tested was cut into circular pieces of 1 cm diameter, and inserted deep into the pocket. Then the incision used for insertion was sutured with veterinary staples. After the operation, the mice having the test sample embedded therein were raised under free access to water and feed. Three of the animals were slaughtered every three days, and examined subcutaneously to visually confirm the presence/absence of the residual material.

<Anti-Adhesion Test Procedure>

For evaluation of the anti-adhesion property, seven-week-old female Wistar rats, four animals in each group, were shaved in the lower abdomen under Nembutal anesthesia, and disinfected. A median incision of about 2 cm long was made to expose the right and left uterine horns, adipose tissues around the uterus were removed, and the uterine horns were abraded ten times with absorbent cotton impregnated with iodine tincture. The right and left uterine horns were exposed in the air for 3 minutes to air dry the surface. A film of the material to be tested was cut into pieces of about 2 cm×2 cm, and applied over the abrasion on the uterine horns to cover. The uterine horns were returned into the abdominal cavity, and the peritoneum and the skin were sutured to close the incision. On day 15 after the surgery, the degree of adhesion between the uterus surface and the surrounding tissues was evaluated by abdominal operation.

The evaluation was made by the average of the points assigned to the results in accordance with the following criteria: 0 point when no adhesion was observed; 1 point when, adhesion on the uterine horn surface was observed but no bleeding occurred upon detachment of the adhesion; 2 points when minor adhesion causing bleeding was observed; and 3 points when severe adhesion causing bleeding and inflammation were observed.

In parallel with the anti-adhesion test, a test was conducted according to the same surgical procedures as in the anti-adhesion test, except that the test sample was not used, and evaluated as a control test for determining the validity of the test.

<Tensile Tests>

The thickness of the obtained film was measured as it is or after soaking in distilled water for 30 minutes, and then the film was cut into pieces of 20 mm long and 2 mm wide. Each piece was subjected to the tensile test using Rheometer RE3305 (trade name) manufactured by YAMADEN CO., LTD. to determine the stress-strain curve and the maximum tension (%)

Example 1-1

Under dry inert gas atmosphere, 1 g of previously lyophilized PEG having a hydroxyl group at each end and having a number average molecular weight of 11000, 0.580 g of L-lactide, and 0.076 g of cyclo(glycolic acid-leucine) as depsipeptide were introduced into a reaction tube for polymerization, and 1.8 mg of tin(II) 2-ethylhexanoate dissolved in a small amount of THF was added. Degassing, substitution with inert gas, and degassing were repeated for three cycles. After complete removal of THF, the reaction was performed in a 150° C. oil bath for 2 minutes, and then in a 115° C. oil bath for 24 hours. The reaction product was dissolved in chloroform, and added dropwise into water-cooled diethyl ether to precipitate white solid. The solid was separated by suction filtration, dissolved in chloroform, crystallized repeatedly from diethyl ether, and dried under reduced pressure, to thereby obtain an $A^1$-B-$A^2$ triblock copolymer of a structure, poly[lactide-r-(glycolic acid-amino acid)]-PEG-poly[lactide-r-(glycolic acid-amino acid)], wherein -r- represents random polymerization.

Figure 2:
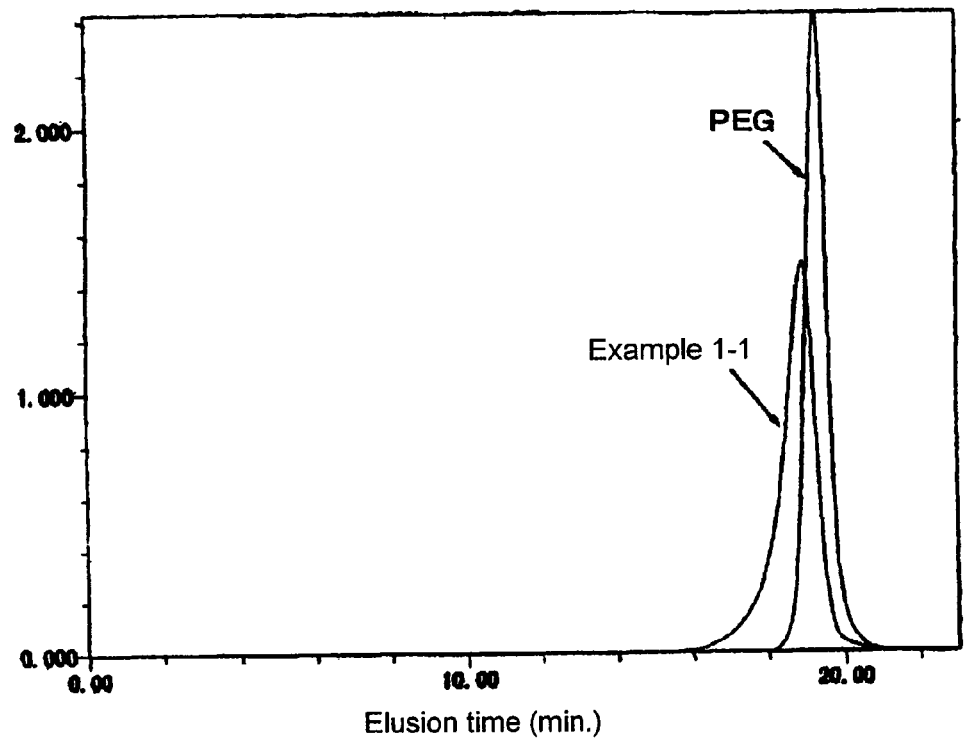
FIG. 2 shows a GPC spectrum of the triblock copolymer synthesized in Example 1-1.

The $^1$H-NMR and GPC of the obtained copolymer were determined. The result of the measurement of $^1$H-NMR is shown in FIG. 1, and the result of GPC analysis in FIG. 2.

From the result of the $^1$H-NMR measurement, δ (ppm)= 0.96 (d, C$\underline{H}_3$CHC$\underline{H}_3$), 1.58 (d, CHC$\underline{H}_3$), 1.67 (m, C$\underline{H}_2$C$\underline{H}$), 1.75 (m, $\overline{CHCH_2}$), 3.66 (s, —OC$\underline{H}_2$CH$_2$O—), 4.29 (t, —OC$\underline{H}_2$CH$_2$OCO—), 4.35 (m, C$\underline{H}$($\overline{CH_3}$)OH), 4.6 (m, C$\underline{H}$NH), 4.71 (m, —OC$\underline{H}_2$CO—), 5.15 (q, C$\underline{H}$CH$_3$) were determined. The percentage of depsipeptide introduced z (%) was calculated from the ratio of the integral of the methine group proton of polylactide (5.15 ppm) and the integral of the methyl group proton of depsipeptide (0.98 ppm). The molar ratio of lactide to PEG was calculated from the ratio of the integral of the methine group proton of polylactide (5.15 ppm) and the integral of the terminal methine proton (4.35 ppm). The molar ratio of depsipeptide to lactide is calculated from the percentage of depsipeptide introduced z (corresponding to y/(x+y) in the formula (1)), and the calculated average polymerization degree of the monomers in segments $A^1$ and $A^2$ with respect to PEG, was obtained. Further, the number average molecular weight of the triblock copolymer was measured. From the GPC measurement, the molecular weight distribution Mw/Mn was also determined. The results are shown in Table 1.

Incidentally in Table 1, the average polymerization degree (m) of segments $A^1$ and $A^2$ was calculated as if segments $A^1$=$A^2$ for the sake of convenience. That is, the average polymerization degree of segments $A^1$ and $A^2$ shown in Table 1 is a value obtained by the formula m=(average polymerization degree of segment $A^1$+average polymerization degree of segment $A^2$)/2.

From the above determination, it was confirmed that a relatively monodisperse $A^1$-B-$A^2$ triblock copolymer had been produced. A signal of methylene (CH$_2$C$\underline{H}_2$OH) at the end of the starting material PEG in $^1$H-NMR spectra should have been detected originally around 3.7 ppm as a minor peak, but in the measurement of the obtained copolymer, this peak was not detected, but instead a new peak corresponding to an ester bond was detected around 4.3 ppm. Further, in the result of GPC, the peak corresponding to the starting material PEG had disappeared, and a single peak was observed to be shifted to higher molecular weights. From these observations, it was conclusively confirmed that a triblock copolymer had been obtained.

Example 1-2

An $A^1$-B-$A^2$ triblock copolymer was obtained in the same way as in Example 1-1, except that 1 g of PEG having a number average molecular weight of 20000 was used as the PEG, the amount of L-lactide was 0.285 g, and the amount of cyclo(glycolic acid-leucine) was 0.037 g. The obtained copolymer was subjected to the various measurements. The results are shown in Table 1.

Example 1-3

An $A^1$-B-$A^2$ triblock copolymer was obtained in the same way as in Example 1-1, except that the amount of L-lactide was 0.435 g, and the amount of cyclo(glycolic acid-leucine) was 0.057 g. The obtained copolymer was subjected to the various measurements. The results are shown in Table 1.

Example 1-4

An $A^1$-B-$A^2$ triblock copolymer was obtained in the same way as in Example 1-2, except that the amount of L-lactide was 0.212 g, and the amount of cyclo(glycolic acid-leucine) was 0.028 g. The obtained copolymer was subjected to the various measurements. The results are shown in Table 1.

Example 1-5

An $A^1$-B-$A^2$ triblock copolymer was obtained in the same way as in Example 1-2, except that the amount of L-lactide was 0.373 g, and the amount of cyclo(glycolic acid-leucine) was 0.111 g. The obtained copolymer was subjected to the various measurements. The results are shown in Table 1.

Example 1-6

An $A^1$-B-$A^2$ triblock copolymer was obtained in the same way as in Example 1-2 at 87% yield, except that 0.037 g of cyclo(glycolic acid-leucine) as a depsipeptide was replaced with 0.035 g of cyclo(glycolic acid-methoxybenzyl-S-cysteine. The obtained copolymer was subjected to the various measurements. The results are shown in Table 1.

The GPC measurement of the obtained copolymer indicated that the peak corresponding to the starting material PEG had disappeared, and a single peak was observed to be shifted to higher molecular weights. The results of $^1$H-NMR measurement indicated that, in addition to the signal at 3.6 ppm corresponding to —$OCH_2CH_2O$—, characteristic signals were detected at 1.2 ppm (t, SH) and 2.9 ppm (s, $CHCH_2S$). It was thus confirmed that an $A^1$-B-$A^2$ triblock copolymer had been obtained.

Example 1-7

An $A^1$-B-$A^2$ triblock copolymer was obtained in the same way as in Example 1-2, except that the amount of L-lactide was 0.415 g, and the amount of cyclo(glycolic acid-leucine) was 0.055 g. The obtained copolymer was subjected to the various measurements. The results are shown in Table 1.

Example 1-8

An $A^1$-B-$A^2$ triblock copolymer was obtained in the same way as in Example 1-2, except that the amount of L-lactide was 0.837 g, and the amount of cyclo(glycolic acid-leucine) was 0.110 g. The obtained copolymer was subjected to the various measurements. The results are shown in Table 1.

Example 1-9

An $A^1$-B-$A^2$ triblock copolymer was obtained in the same way as in Example 1-2, except that the amount of L-lactide was 0.615 g, and the amount of cyclo(glycolic acid-leucine) was 0.333 g. The obtained copolymer was subjected to the various measurements. The results are shown in Table 1.

Referential Example 1-1

A polylactide-PEG-polylactide $A^1$-B-$A^2$ triblock copolymer was obtained in the same way as in Example 1-1, except that the amount of L-lactide was 0.805 g, and depsipeptide was not used. The obtained copolymer was subjected to the various measurements. The results are shown in Table 1.

TABLE 1

| | $A^1$, $A^2$ average polymerization degree | B: PEG Polymerization degree (n) | Mn × $10^{-4}$ | R | Percentage of introduction z | Number average molecular weight of copolymer Mn × $10^{-4}$ | Distribution Mw/Mn |
|---|---|---|---|---|---|---|---|
| Example 1-1 | 21.7 | 250 | 1.1 | $(CH_3)_2CHCH_2$— | 9.0 | 1.63 | 1.28 |
| Example 1-2 | 17.5 | 454 | 2.0 | $(CH_3)_2CHCH_2$— | 6.9 | 2.37 | 1.13 |
| Example 1-3 | 15.1 | 250 | 1.1 | $(CH_3)_2CHCH_2$— | 9.6 | 1.45 | 1.32 |
| Example 1-4 | 10.8 | 454 | 2.0 | $(CH_3)_2CHCH_2$— | 10.0 | 2.37 | 1.13 |
| Example 1-5 | 28.7 | 454 | 2.0 | $(CH_3)_2CHCH_2$— | 20 | 2.60 | 1.26 |
| Example 1-6 | 22.2 | 454 | 2.0 | $CH_3O$—$C_6H_4$—CH—$SCH_2$— | 8.1 | 2.51 | 1.12 |
| Example 1-7 | 28.7 | 454 | 2.0 | $(CH_3)_2CHCH_2$— | 9.1 | 2.89 | 1.19 |
| Example 1-8 | 58.1 | 454 | 2.0 | $(CH_3)_2CHCH_2$— | 8.2 | 3.39 | 1.38 |
| Example 1-9 | 57.8 | 454 | 2.0 | $(CH_3)_2CHCH_2$— | 28 | 3.40 | 1.33 |
| Referential Example 1-1 | 27.1 | 250 | 2.0 | — | 0 | 1.78 | 1.24 |

Example 2-1

Figure 3:
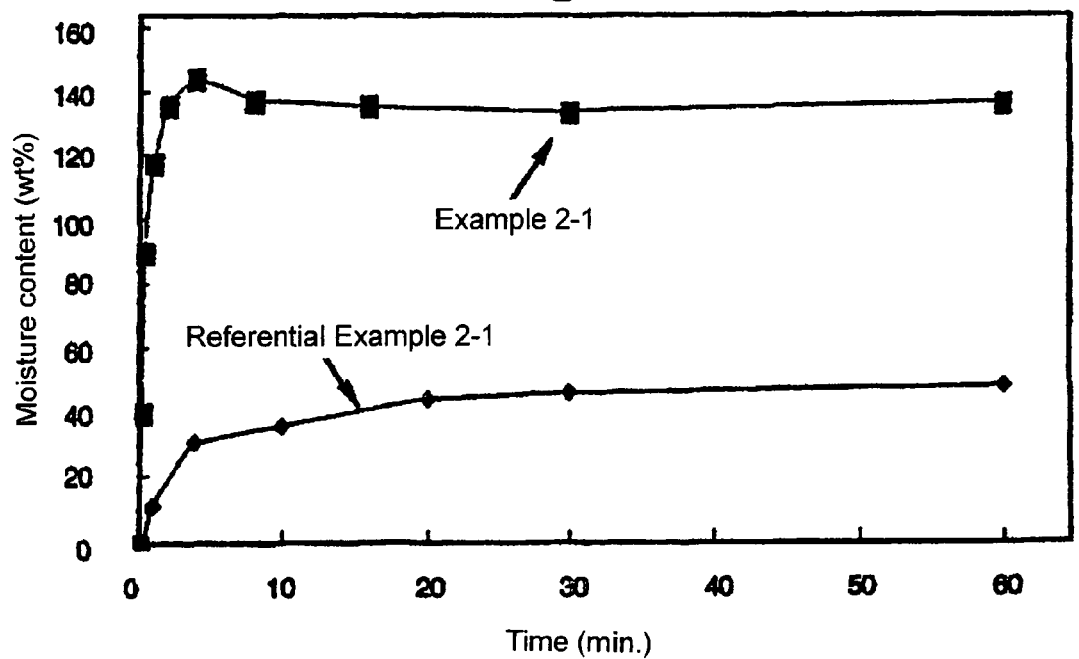
FIG. 3 is a graph showing the changes in moisture content against time of the triblock copolymer films prepared in Example 2-1 and Referential Example 2-1.

The triblock copolymer prepared in Example 1-1 was dissolved in chloroform to prepare a 4 wt % solution. The solution was poured into a petri dish of 50 cm diameter made of Teflon (trade mark), and dried overnight at 25° C. to prepare a tissue anti-adhesion film as a biocompatible material. The obtained film was soaked in ultrapure water, and the film was weighed at intervals to determine its water absorbability. From the obtained results, the weight after soaking with respect to the initial weight was calculated. A graph showing the change in moisture content against time is shown in FIG. 3. FIG. 3 indicates that the obtained triblock copolymer is excellent in both rate and amount of water absorption.

The obtained film was also subjected to the bending test and the bioabsorbability test mentioned above. The results are shown in Table 2. Further, the anti-adhesion test and the tensile test were performed. The results are shown in Table 3.

Comparative Example 2-1

A film was prepared in the same way as in Example 2-1 using the triblock copolymer prepared in Referential Example 1-1, and the moisture content was measured at intervals. The results are shown in FIG. 3. The film was also subjected to the bending test and the bioabsorbability test. The results are shown in Table 2. Further, the anti-adhesion test was performed. The results are shown in Table 3.

Example 2-2

A tissue anti-adhesion film was prepared in the same way as in Example 2-1, except that the triblock copolymer prepared in Example 1-2 was used. The obtained film was subjected to the bending test, bioabsorbability test, anti-adhesion test, and tensile test. The results are shown in Tables 2 and 3.

Comparative Example 2-2

A tissue anti-adhesion film was prepared in the same way as in Example 2-1, except that a commercial synthetic anti-adhesion sheet (manufactured by GENZYME CORPORATION) containing sodium hyaluronate and carboxymethyl cellulose (CMC) at 2:1, was used instead of the film, and the bending test, bioabsorbability test, and anti-adhesion test were performed. The results are shown in Tables 2 and 3.

Example 2-3

Figure 4:
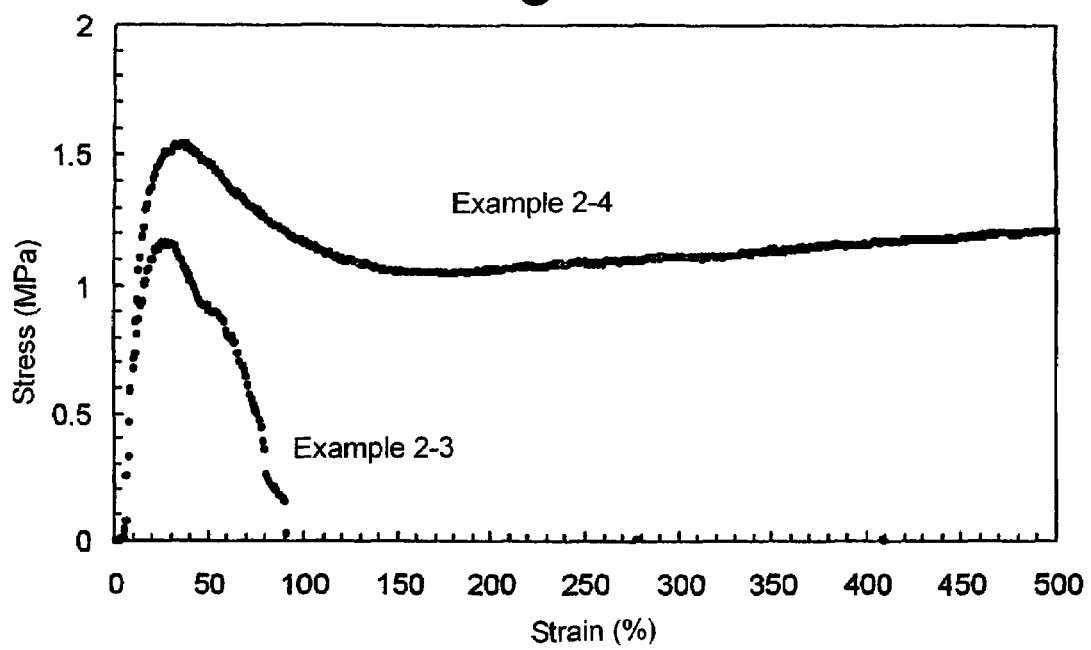
FIG. 4 is a graph showing the results of the tensile test on the dry films prepared in Examples 2-3 and 2-4.
Figure 5:
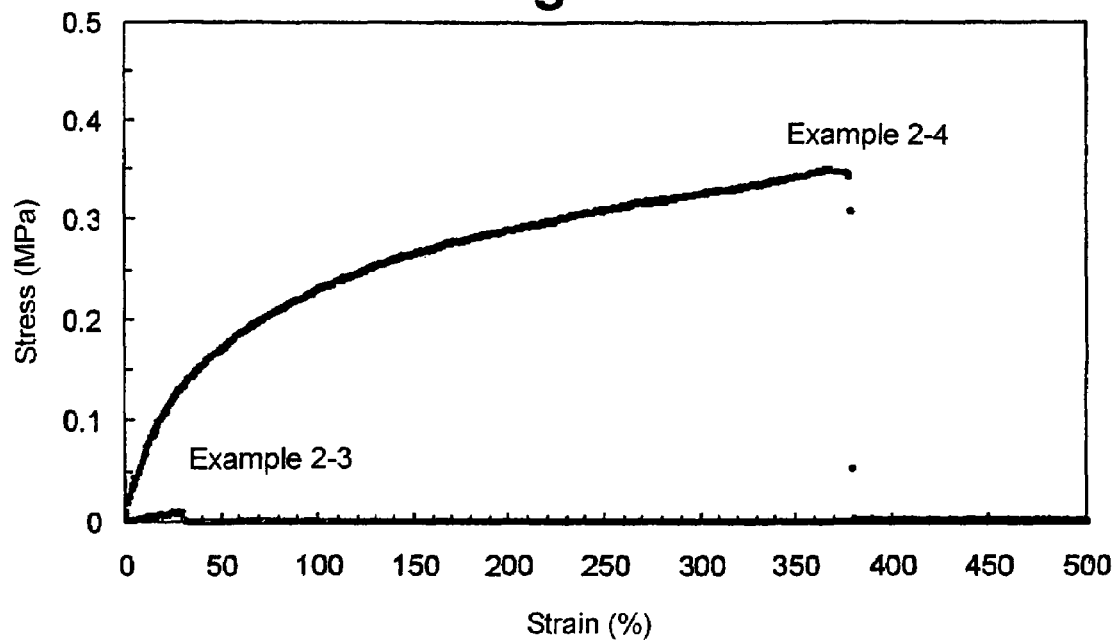
FIG. 5 is a graph showing the results of the tensile test on the wet films prepared in Examples 2-3 and 2-4.

A tissue anti-adhesion film was prepared in the same way as in Example 2-1, except that the triblock copolymer prepared in Example 1-7 was used. The obtained film was subjected to the bending test, bioabsorbability test, anti-adhesion test, and tensile test. The results are shown in Tables 2 and 3. The results of the tensile tests on dry and wet films are shown in FIGS. 4 and 5, respectively.

Example 2-4

A tissue anti-adhesion film was prepared in the same way as in Example 2-1, except that the triblock copolymer prepared in Example 1-8 was used. The obtained film was subjected to the bending test, bioabsorbability test, and anti-adhesion test. The results are shown in Tables 2 and 3. The results of the tensile tests on dry and wet films are shown in FIGS. 4 and 5, respectively.

Example 2-5

A tissue anti-adhesion film was prepared in the same way as in Example 2-1, except that the triblock copolymer prepared in Example 1-9 was used. The obtained film was subjected to the bending test, bioabsorbability test, anti-adhesion test, and tensile test. The results are shown in Tables 2 and 3.

TABLE 2

| | Triblock copolymer | Bending test | Bioabsorbability test (days after surgery) | | | |
|---|---|---|---|---|---|---|
| | | | Day 3 | Day 6 | Day 9 | Day 12 |
| Example 2-1 | Example 1-1 | bent | present | absent | absent | absent |
| Example 2-2 | Example 1-2 | bent | present | present | absent | absent |
| Example 2-3 | Example 1-7 | bent | present | present | present | absent |
| Example 2-4 | Example 1-8 | bent | present | present | present | absent |
| Example 2-5 | Example 1-9 | bent | present | absent | absent | absent |
| Comparative Example 2-1 | Referential Example 1-1 | not bent | present | present | present | present |
| Comparative Example 2-2 | Commercial product | not bent | absent | absent | absent | absent |

TABLE 3

| | Dry film Maximum tension (%) | Wet film Maximum tension (%) | Adhesion score |
|---|---|---|---|
| Example 2-1 | 4 | NA | 1.3 |
| Example 2-2 | 18 | NA | 1.2 |
| Example 2-3 | 80 | 25 | 1.0 |
| Example 2-4 | >500 | 250 | 1.2 |
| Example 2-5 | >500 | >500 | — |

From the above results, the biocompatible material according to the present invention was confirmed to have bioabsorbability and flexibility. The present biocompatible material was also demonstrated to be capable of being formed into a sheet, and have sufficient strength and moisture retaining ability. By changing its composition, the bioabsorbability of the present material may be controlled. The present material was further confirmed to have tissue anti-adhesion property for preventing postoperative adhesion. Thus, the biocompatible material of the present invention is suitable for a tissue anti-adhesion barrier or the like material.

What is claimed is:

1. An $A^1$-B-$A^2$ triblock copolymer consisting of segments $A^1$ and $A^2$ each composed of a polymer having a depsipeptide unit, and segment B composed of polyalkylene glycol, said copolymer having a number average molecular weight of 8000 to 500000.

2. The triblock copolymer of claim 1, wherein said polymer having a depsipeptide unit is selected from the group consisting of a homopolymer of depsipeptide, and a copolymer of lactide and depsipeptide.

3. The triblock copolymer of claim 1, wherein said polyalkylene glycol is polyethylene glycol.

4. The triblock copolymer of claim 2, wherein said triblock copolymer is represented by the formula (1):

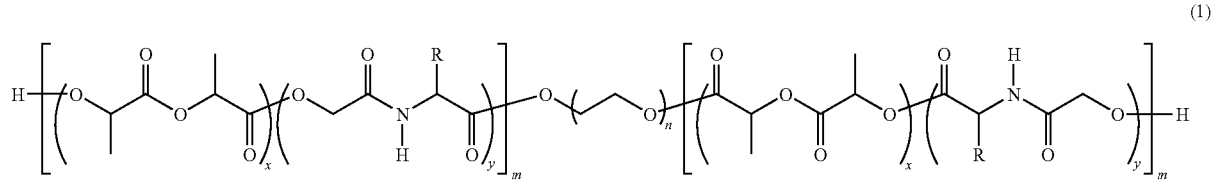

wherein R stand for a hydrogen atom, $CH_3-$, $CH_3CH_2-$, $(CH_3)_2CH-$, $(CH_3)_2CHCH_2-$, $CH_3CH_2CH(CH_3)-$, $C_6H_5CH_2-$, $C_6H_5CH_2O(C=O)CH_2-$, $C_6H_5CH_2O(C=O)CH_2CH_2-$, $C_6H_5CH_2O(C=O)NH(CH_2)_4-$, $C_6H_5(C=O)OCH_2-$, $C_6H_5(C=O)OC(CH_3)H-$, $CH_3O-C_6H_4-CH-SCH_2-$, or $CH_3(CH_2)_{t-1}-S-SCH_2-$, provided that t is a positive integer; x and y each represents the number of repeating units in segments $A^1$ and $A^2$, x is a number of 0 or more, y is a number of 1 or more, and x and y satisfy the formula $0.04 \leq (y/(x+y)) \leq 1$; m and n each represents a polymerization degree, m is a positive integer, and n is an integer of 100 to 1200.

5. A method for producing a triblock copolymer of claim 4, comprising ring-opening polymerizing depsipeptide and lactide with a hydroxyl group at each end of polyethylene glycol having a polymerization degree of 100 to 1200, in the presence of a metal catalyst for ring-opening polymerization without a solvent.

6. A biocompatible material comprising an $A^1$-B-$A^2$ triblock copolymer of claim 1 as a main component.

7. The biocompatible material of claim 6, wherein said triblock copolymer is a triblock copolymer of claim 4.

8. The biocompatible material of claim 7, wherein in the formula (1) representing said copolymer, x and y satisfy the formula $0.04 \leq (y/(x+y)) \leq 0.2$, and n is an integer of 250 to 455.

9. The biocompatible material of claim 6, wherein said polyalkylene glycol in segment B is polyethylene glycol, polypropylene glycol, or polybutylene glycol.

10. The biocompatible material of claim 7, wherein said biocompatible material is a tissue anti-adhesion barrier.

* * * * *